G. BARTLETT.
Vehicle Wheel-Hub.
No. 206,213. Patented July 23, 1878.
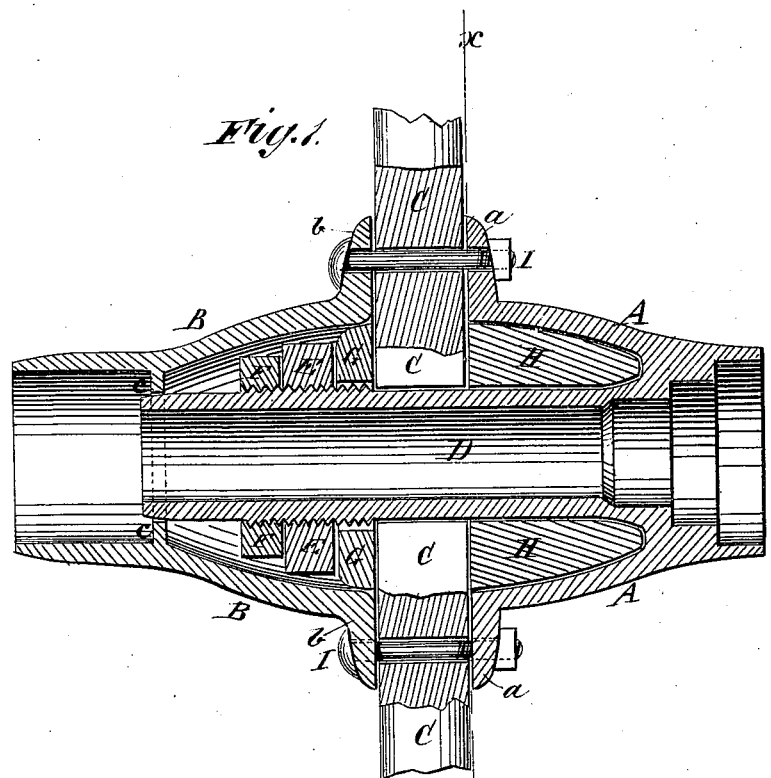
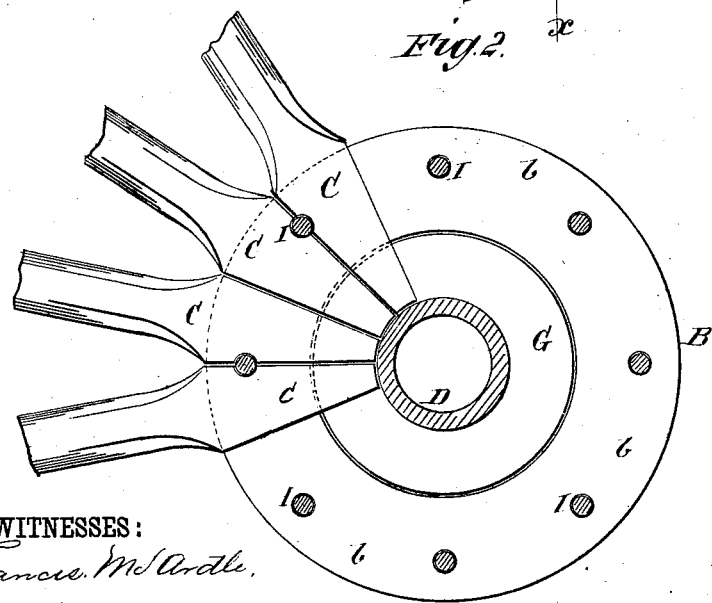
WITNESSES:
Francis McArdle
C. Sedgwick
INVENTOR:
G. Bartlett
BY Munn & Co
ATTORNEYS.

UNITED STATES PATENT OFFICE.

GEORGE BARTLETT, OF GANANOQUE, ONTARIO, CANADA.

IMPROVEMENT IN VEHICLE-WHEEL HUBS.

Specification forming part of Letters Patent No. 206,213, dated July 23, 1878; application filed June 6, 1878.

*To all whom it may concern:*

Be it known that I, GEORGE BARTLETT, of Gananoque, Ontario, Canada, have invented a new and Improved Wheel-Hub, of which the following is a specification:

The object of my invention is to furnish a strong and easily-attachable hub for the wheels of vehicles, and whose application will insure a true wheel.

In the accompanying drawing, Figure 1 represents a longitudinal section of my improved wheel-hub. Fig. 2 is a cross-section of the same, taken on the line $x\,x$ of Fig. 1.

Similar letters of reference indicate corresponding parts.

The hub is made in two parts, A and B, clamping the spokes C between them. A is the inner half of the hub, cast in one piece with the axle-box D and with the flange $a$, the plane of the latter being at right angles to the axial line of the central axle-box D, so that the plane of the spokes C, (and thus also of the wheel,) when clamped against the plane of the flange $a$, will be at right angles to the axle-box, thus insuring the wheel to run true. The spokes C are fitted radially on the surface-plane of the flange $a$, with their ends resting against the axle-box D as their central core, and are clamped in position by the nut E and the jam-nut F, working in threads cut upon the outer circumference of the axle-box D, a loose collar, G, being first slid over the threaded axle-box D, and interposed between the inner nut E and the spokes C, to form the surface of contact.

In order to be light, the inner half A of the hub is cast with an annular hollow surrounding the axle-box D, which, for the sake of strength, and to give good and proper bearing-surface for the spokes, is filled with a suitable ring-block, H, of wood.

The outer half B of the hub is a hollow casting suitable to inclose the nuts F E and collar G, and is provided with an inner annular rib, $c$, fitting the outer periphery of the axle-box, so as to center the hub upon the said box, while the plane of the flange $b$ (similar to the flange $a$, and cast upon the part B) coincides with the plane of the spokes C. The two parts A and B of the hub are then secured together and to the spokes C on opposite sides by bolts or rivets I, inserted through holes made continuous through the flange $b$, spokes C, and flange $a$.

The holes through the spokes are, preferably, made in the junction line between two adjacent spokes, leaving a semicircular groove for one-half of the bolt in each.

Having thus described my invention, what I claim as new, and desire to secure by Letters Patent, is—

The loose collar G, the nuts E F, and the axle-box D, combined with sections A B and block H, as specified, to prevent end-play of the spokes in hub.

GEORGE BARTLETT.

Witnesses:
D. J. MOORE,
E. H. ELLIS.